(12) United States Patent
Neubauer

(10) Patent No.: US 12,188,366 B2
(45) Date of Patent: Jan. 7, 2025

(54) ALIGNMENT TOOL

(71) Applicant: General Electric Company, Schenectady, NY (US)

(72) Inventor: Mark E. Neubauer, Evendale, OH (US)

(73) Assignee: GENERAL ELECTRIC COMPANY, Evandale, OH (US)

( * ) Notice: Subject to any disclaimer, the term of this patent is extended or adjusted under 35 U.S.C. 154(b) by 81 days.

(21) Appl. No.: 17/900,524

(22) Filed: Aug. 31, 2022

(65) Prior Publication Data

US 2024/0068383 A1 Feb. 29, 2024

(51) Int. Cl.
*F16H 57/022* (2012.01)
*F01D 25/28* (2006.01)
*F16H 57/02* (2012.01)

(52) U.S. Cl.
CPC ........... *F01D 25/285* (2013.01); *F16H 57/02* (2013.01); *F05D 2230/644* (2013.01); *F05D 2240/60* (2013.01); *F16H 2057/02021* (2013.01)

(58) Field of Classification Search
CPC ............................................... F16H 2057/0225
USPC .................................. 33/412, 533, 613, 645
See application file for complete search history.

(56) References Cited

U.S. PATENT DOCUMENTS

| | | | | |
|---|---|---|---|---|
| 3,525,158 A | * | 8/1970 | Torlay | G01B 5/25 |
| | | | | 248/230.8 |
| 5,479,718 A | * | 1/1996 | Cook | G01B 5/25 |
| | | | | 33/412 |
| 5,806,161 A | | 9/1998 | Schneider | |
| 5,843,201 A | * | 12/1998 | Borbone | C03B 9/165 |
| | | | | 65/159 |
| 5,846,282 A | * | 12/1998 | Pinkerton | C03B 9/447 |
| | | | | 65/159 |
| 5,860,864 A | | 1/1999 | Vukovic | |
| 6,883,224 B2 | | 4/2005 | Thomas | |

(Continued)

FOREIGN PATENT DOCUMENTS

| CA | 3140868 A1 | 6/2022 |
|---|---|---|
| DE | 4005708 A1 | 8/1991 |

(Continued)

OTHER PUBLICATIONS

European Patent Office, "Extended European Search Report," issued in connection with European Patent Application No. 23174179.4, dated Jan. 31, 2024, 8 pages.

(Continued)

*Primary Examiner* — George B Bennett
(74) *Attorney, Agent, or Firm* — HANLEY, FLIGHT & ZIMMERMAN, LLC

(57) ABSTRACT

Methods, apparatus, systems, and articles of manufacture are disclosed. An example apparatus includes a tubular or cylindrical body including a shaft, a shoulder, and a neck, the shaft coupled to the shoulder, the shoulder coupled to the neck, the shoulder having a greater diameter than respective diameters of the shaft and the neck. The example apparatus includes a plug coupled to the shoulder at a first plug edge and coupled to a first fastener at a second plug edge, the first fastener including a hole. The example apparatus includes a second fastener coupled to the first fastener, the second fastener extending through the tubular body, the plug, and the first fastener.

20 Claims, 8 Drawing Sheets

(56) References Cited

U.S. PATENT DOCUMENTS

| | | | |
|---|---|---|---|
| 7,175,342 B2* | 2/2007 | Tanaka | G01N 25/16 33/645 |
| 7,658,242 B2* | 2/2010 | Duncan | E21B 19/24 175/57 |
| 7,765,082 B2 | 7/2010 | Lee | |
| 8,037,615 B2* | 10/2011 | Glaser | G01B 11/272 33/529 |
| 8,533,965 B2* | 9/2013 | Stromberg | G01B 11/27 33/412 |
| 8,955,230 B2* | 2/2015 | Alexander | G01B 5/25 33/645 |
| 8,997,365 B2 | 4/2015 | Alexander et al. | |
| 9,146,101 B2* | 9/2015 | Canu | G01B 11/272 |
| 9,421,003 B2* | 8/2016 | Williams | A61B 17/00234 |
| 9,976,332 B2* | 5/2018 | Scheuring | F16D 7/06 |
| 10,132,179 B2 | 11/2018 | LeBlanc et al. | |
| 11,692,817 B2* | 7/2023 | Jozokos | F01D 25/285 33/412 |
| 11,982,344 B2* | 5/2024 | Li | F16H 57/021 |
| 2017/0008138 A1 | 1/2017 | Nicholas et al. | |
| 2022/0056958 A1 | 2/2022 | Xu | |
| 2022/0161925 A1 | 5/2022 | Bernklau | |

FOREIGN PATENT DOCUMENTS

| | | |
|---|---|---|
| JP | 2010137766 A | 6/2010 |
| WO | 2018055427 A1 | 3/2018 |

OTHER PUBLICATIONS

Piotrowski, John, "Shaft Alignment Handbook," dated Nov. 2, 2006, CRC Press, 832 pages. Partial review downloaded from https://books.google.com/books/about/Shaft_Alignment_Handbook.html?id=qhbNBQAAQBAJ, 15 pages. (Preview provided).

* cited by examiner

ALIGNMENT TOOL

FIELD OF THE DISCLOSURE

This disclosure relates generally to alignment and, more particularly, to tools for alignment of a driver and a driven component.

BACKGROUND

Rotating machinery often includes a driver and driven components. The driver and the driven components may be connected by a shaft. Proper alignment of the shaft is an important factor in ensuring proper function of the rotating machinery.

Figure 1:
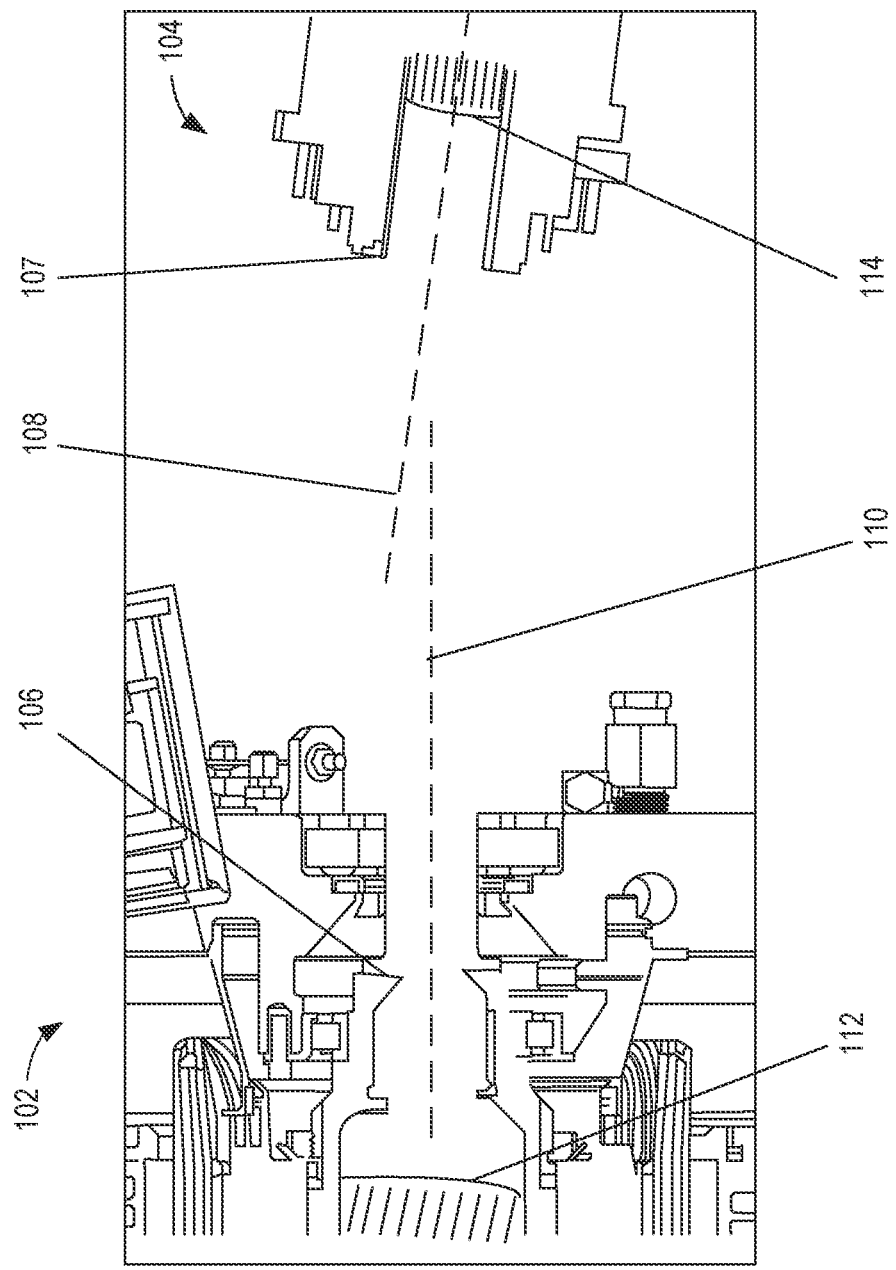
FIG. 1 is an illustration of an example gearbox and motor that are misaligned.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

Rotating machinery such as pumps, turbines, compressors, gears, and fans all include rotating shafts. The rotating shafts operate at high revolutions per minute (RPM), connecting a driver and driven elements.

Some modern rotating machinery operates at an extremely high speed (e.g., 40,000 RPM). In such machinery, proper shaft alignment is necessary to ensure effective operation of the rotating machinery. Improper shaft alignment can be associated with increased temperatures, excessive lubricant leakage, premature wear, and failure of the shaft. Rotating equipment with a misaligned shaft can also be dangerous. Improperly aligned shafts may cause excessive vibrations that lead to coupling failures, which may expel machine components from the rotating machinery at high speeds.

Conventional alignment solutions are often based on alignment of male shafts extending from each of the driver and the driven elements. In conventional alignment solutions, a coarse alignment can be achieved by aligning protruding shafts by moving a machine base, shimming the machinery, etc. Then, a dial indicator can confirm the alignment and/or facilitate measurements and determine any desired adjustments. Once aligned, a flexible coupling may lock the shafts together.

Conventional solutions cannot align a driver (e.g., a motor) and driven element (e.g., a gearbox) that both include female internally splined shafts. Examples disclosed herein permit alignment of the centerlines of two high speed rotating components that lack protruding features for alignment.

Disclosed examples include an alignment tool for a motor-driven propeller (MDP) gearbox. The motor-driven propeller includes both a motor and a gearbox that each have female splined shafts, with an intermediate rotating shaft connecting the motor and the gearbox. As the motor-driven propeller drivetrain does not include shafts that protrude from the motor or the gearbox, conventional solutions fail to achieve accurate alignment of the motor-driven propeller.

Disclosed examples include a first alignment tool with a first shaft and an expandable elastomer plug that is inserted into the gearbox. The expandable elastomer plug can be formed of urethane, rubber, silicone, etc. Some examples include a second alignment tool with a second shaft and a second expandable elastomer plug that is inserted into the motor. Expansion of the expandable plugs secures each respective alignment tool in place. The expansion occurs due to the Poisson's ratio of the plug and axial compression of the plug.

After alignment with the first and second alignment tools, the example MDP motor and the MDP propeller are then pinned in location. Removing either the motor or the gearbox allows the rotating shaft to be inserted. The removed motor or gearbox is re-installed using the pinned location.

In some examples, a motor may have a female splined shaft for alignment with a male stub shaft extending from a gearbox. In such an example, a single alignment tool may be inserted into the gearbox and aligned with the male stub shaft. In some examples, a gearbox may have a female splined shaft for alignment with a male stub shaft extending from a motor. In such an example, a single alignment tool may be inserted into the motor and aligned with the male stub shaft.

Disclosed examples may be used on a hybrid electric aircraft. Hybrid aircraft drivetrains in the field may include a motor-driven shaft that has become misaligned due to removal of one or both components for maintenance. Motor-driven alignment tools may also be used to align newly installed and/or replacement motors in the hybrid electric aircraft. Therefore, disclosed examples may be provided to maintenance/repair teams as a part of an aircraft repair toolset. Furthermore, the alignment tools described herein are not limited to use with motor-driven propellers. The motor and/or gearbox alignment tools may be adapted to provide a removable shaft for any machinery with female splined shafts.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Turning to the figures, FIG. 1 is an illustration of an example motor 102 and a gearbox 104 that are misaligned. The motor 102 includes a motor armature shaft 106. The motor armature shaft 106 is a separable motor armature shaft that further includes internal motor splines 112. A first alignment axis 110 extends from a center point of the motor armature shaft 106 outwards, illustrating an axis for alignment of the motor 102 and the gearbox 104. The example motor 102 includes internal motor splines 112 and there is no external protrusion of the motor armature shaft 106 for alignment with the gearbox 104.

The gearbox 104 includes a gearbox shaft 107 and internal gearbox splines 114. Similarly to the motor 102, the gearbox 104 does not include an external protrusion to facilitate alignment.

The example first alignment axis 110 of the motor 102 and a second alignment axis 108 of the gearbox 104 are not parallel when initially installed due to machining tolerances, surrounding mount hardware, etc. Therefore, the motor 102 and the gearbox 104 are not in alignment. However, the gearbox 104 and the motor 102 should be aligned for effective operation. As will be described in association with FIG. 2, disclosed examples provide alignment tools that can be used to align the motor 102 and the gearbox 104.

Figure 2:
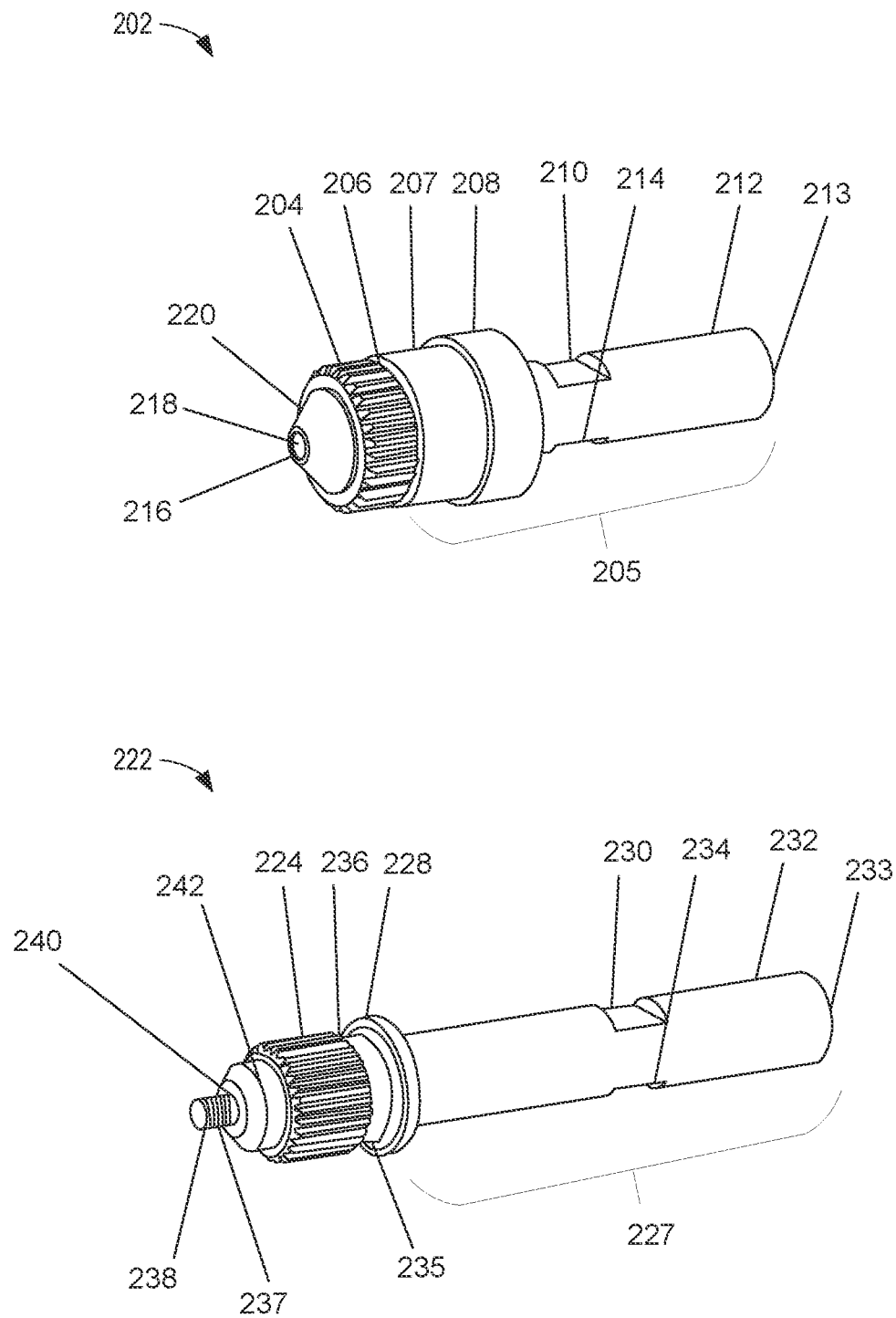
FIG. 2 is an illustration of an example gearbox alignment tool and a motor alignment tool.

FIG. 2 is an illustration of an example gearbox alignment tool 202 and a motor alignment tool 222. The gearbox alignment tool 202 includes at least four components: a first tubular body 205 (e.g., a first cylindrical body), a first plug 204, a first threaded nut 220, and a first cap screw 218.

A first component of the example gearbox alignment tool 202 is the first tubular body 205. The first tubular body 205 is an elongated member that is generally tubular (e.g., cylindrical) in shape with a hole (as will be described in association with FIG. 4) extending from a first end 213 of the first tubular body 205 to a second end 206 of the first tubular body 205. The hole may be a counterbore hole (as will be described in association with FIG. 4) to allow a screw (e.g., a socket head cap screw) to sit flush with an outer surface of the first tubular body 205. The first tubular body 205 includes a first shaft 212, a first shoulder 208, and a first neck 207.

The example first shaft 212 includes a first flat member 210 and a second flat member 214. The first flat member 210 and the second flat member 214 provide flat surfaces that can be gripped by a wrench or any other tool. The first shaft 212 is coupled to the first shoulder 208 that extends radially outward such the first shoulder 208 bears against an edge of the motor armature shaft 106, locking the first shaft 212 in place. Accordingly, the first shoulder 208 is of greater diameter than the first shaft 212 and the first neck 207.

The example first shoulder 208 is coupled to the first neck 207. The first tubular body 205, and more particularly the first neck 207, includes radial sharp ridges at the second end 206 of the first tubular body 205 that extend towards the first plug 204 and retain the first plug 204. The ridges of the first neck 207 will be illustrated in further detail in FIG. 3.

A second component of the example gearbox alignment tool 202 is the first plug 204. The first plug 204 is coupled to the first shoulder 208 at a first plug edge and coupled to the first threaded nut 220 at a second plug edge. The first plug 204 is an elastomeric plug such as a urethane plug, a rubber plug, etc. The first plug 204 also includes a hole through the first plug 204, a diameter of the hole based on a diameter of the first cap screw 218.

A third example component of the gearbox alignment tool 202 is the first threaded nut 220. The first threaded nut 220 may be any type of fastener. The fastener (e.g., the first threaded nut 220) may couple to a second fastener (e.g., the first cap screw 218) by any means for fastening. Thus, examples disclosed herein are not limited to a threading to couple the first and second fasteners. The first fastener may be welded to the second fastener, the first fastener to generate an axial force along an axis defined by the second fastener. In some examples, the first and second fasteners may be a single, unitary force-generating member.

The first threaded nut 220 includes second ridges (as will be described in association with FIG. 3) extending radially towards the first end 213 and includes second protrusions to couple the first threaded nut 220 to the first plug 204. The first threaded nut 220 is a fastener that includes a first threaded hole 216 with threads to couple the first threaded nut 220 to the first cap screw 218.

A fourth component of the example gearbox alignment tool 202 is the first cap screw 218. The first cap screw 218 may be any type of fastener that may couple (e.g., threadably couple) to another fastener. The first cap screw 218 extends through the first tubular body 205, the first plug 204, and the first threaded nut 220. The first cap screw 218 may include threads at a first threaded end of the first cap screw 218. The first cap screw 218 includes, for example, a socket head that can be adjusted by a hex key, an Allen wrench, and/or any other torquing device.

In certain examples, the first cap screw 218 has a socket head. However, any type of screw (e.g., square head, one-way head, slotted head, torx head, etc.) can be used instead of a socket head cap screw. Furthermore, examples disclosed herein are not limited to a cap screw, a socket head cap screw, or any screw in general: any type of device to generate an axial force on the plug can be used. This extends not only to mechanical fasteners such as bolts (e.g., a hex-head bolt, any threaded or unthreaded bolt), but to methods such as pressurized fluid cylinders that can generate an axial force. Thus, in some examples screw threads facilitate generation of an axial force by a first fastening member. In other examples, a fluid cylinder (e.g., air cylinder, oil cylinder) generates the axial force with axial motion.

The example gearbox alignment tool 202 may be assembled by inserting a threaded end of the first cap screw 218 through the first end 213 towards the second end 206 of the first tubular body 205. The first cap screw 218 is of greater length than the first tubular body 205 (e.g., the first cylindrical body). Therefore, the first cap screw 218 protrudes from the second end 206 of the first tubular body 205 when the head of the first cap screw 218 is flush with the first end 213.

The example first plug 204 may be fed onto the first cap screw 218 and coupled to the second end 206 of the first tubular body 205. The first threaded nut 220 may then be screwed onto threads of the first cap screw 218.

In operation, the example gearbox alignment tool 202 is assembled and inserted into internal gearbox splines 114 of the gearbox 104 of FIG. 1. The gearbox alignment tool 202 is inserted with the first threaded nut 220 in a first position that does not compress the first plug 204. The gearbox alignment tool 202 is advanced into the gearbox 104 until the first shoulder 208 contacts the gearbox shaft 107 of FIG. 1. Next, the first cap screw 218 is tightened, using another open-ended wrench on the machined flat, and more particularly, on the first flat member 210 to prevent rotation. The tightening of the first cap screw 218 causes the first threaded nut 220 to move to a second position towards the first tubular body 205, the second position nearer the first tubular body 205 than the first position.

Movement of the example first threaded nut 220 to the second position axially compresses the first plug 204 which causes the first plug 204 to radially expand and contact the gearbox shaft 107 (FIG. 1). The tightening of the first threaded nut 220 and the effect on the first plug 204 will be described in further detail in association with FIG. 3.

The example motor alignment tool 222 includes a second tubular body 227 (e.g., a second cylindrical body), a second plug 224, a second threaded nut 242, and a second cap screw 238. The second cap screw 238 may, in some instances, be a socket head cap screw. However, any type of device to generate an axial force on the second plug 224 may be used instead of a socket head cap screw.

The second tubular body 227 (e.g., the second cylindrical body) is an elongated member that is generally tubular (e.g., cylindrical) in shape with a hole (as will be described in association with FIG. 4) extending from a third end 233 of the second tubular body 227 to a fourth end 236 of the second tubular body 227. In some instances, the hole may be a counterbore hole (as will be described in association with FIG. 4) to allow a screw (e.g., a socket head cap screw) to sit flush with an outer surface of the second tubular body 227. The second tubular body 227 may be a unitary, integral, and/or one-piece construction that includes a second shaft 232, a second shoulder 228, and a second neck 235. The second shaft 232 includes a third flat member 230 and a fourth flat member 234. The second tubular body 227 may be a unitary (e.g., one-piece) construction or may include multiple parts that are welded and/or otherwise coupled together. In some instances, the first tubular body 205 may be a one-piece member while the second tubular body 227 is a multi-piece member with at least one weld.

The example second shoulder 228 is a protrusion having greater diameter than the second shaft 232 and the second neck 235. The second shoulder 228 is coupled to the second neck 235. The second tubular body 227, and, more particularly, the second neck 235, includes radial sharp ridges (e.g., at a fourth end 236) that extend towards the second plug 224 and retain the second plug 224. The second shoulder 228 is of a different diameter than the first shoulder 208, as the example motor armature shaft 106 and the gearbox shaft 107 are different sizes.

The second plug 224 is coupled to the second shoulder 228 at a third plug edge and coupled to the second threaded nut 242 at a fourth plug edge. The second plug 224 also includes a hole through the second plug 224 to accommodate the second cap screw 238. The second cap screw 238 may be any type of fastener (e.g., a second socket head cap screw) that may couple (e.g., threadably couple) to a second fastener. In some instances, the motor armature shaft 106 of FIG. 1 may be made of a different material than the gearbox shaft 107 of FIG. 1. Accordingly, the second plug 224 may be comprised of a different materials than the first plug 204 to prevent damage to its respective component.

The second threaded nut 242 includes fourth protrusions to couple the second threaded nut 242 to the second plug 224. The second threaded nut 242 may be any type of fastener that may couple (e.g., threadably couple) to a second fastener. The second threaded nut 242 includes a second threaded hole 240 with threads to couple the second threaded nut 242 to the second cap screw 238. The second cap screw 238 (e.g., or any fastener of appropriate length) extends through the second tubular body 227, the second plug 224, and the second threaded nut 242. The second cap screw 238 may include threads at a first threaded end 237 of the second cap screw 238. The second cap screw 238 includes a socket head that can be adjusted by any matching torquing device such as a standard wrench, screwdriver, socket wrench, Allen wrench, etc.

The example motor alignment tool 222 is assembled and inserted into internal motor splines of the example motor 102 of FIG. 1 until the second shoulder 228 contacts the end of the motor armature shaft 106 of FIG. 1 (e.g., in order to assure the second shaft 232 is colinear with the motor armature shaft 106). Next, the second cap screw 238 is tightened, expanding the example second plug 224 and securing the example motor alignment tool 222 into position.

Thus, the example motor alignment tool 222 shares geometric characteristics with the gearbox alignment tool 202. However, when compared to the gearbox alignment tool 202, the motor alignment tool 222 includes resized and/or reshaped analogues of members of the gearbox alignment tool 202. The differences in shape between the gearbox alignment tool 202 and the motor alignment tool 222 are based on respective geometric characteristics of the gearbox 104 of FIG. 1 and the motor 102 of FIG. 1.

Figure 3:
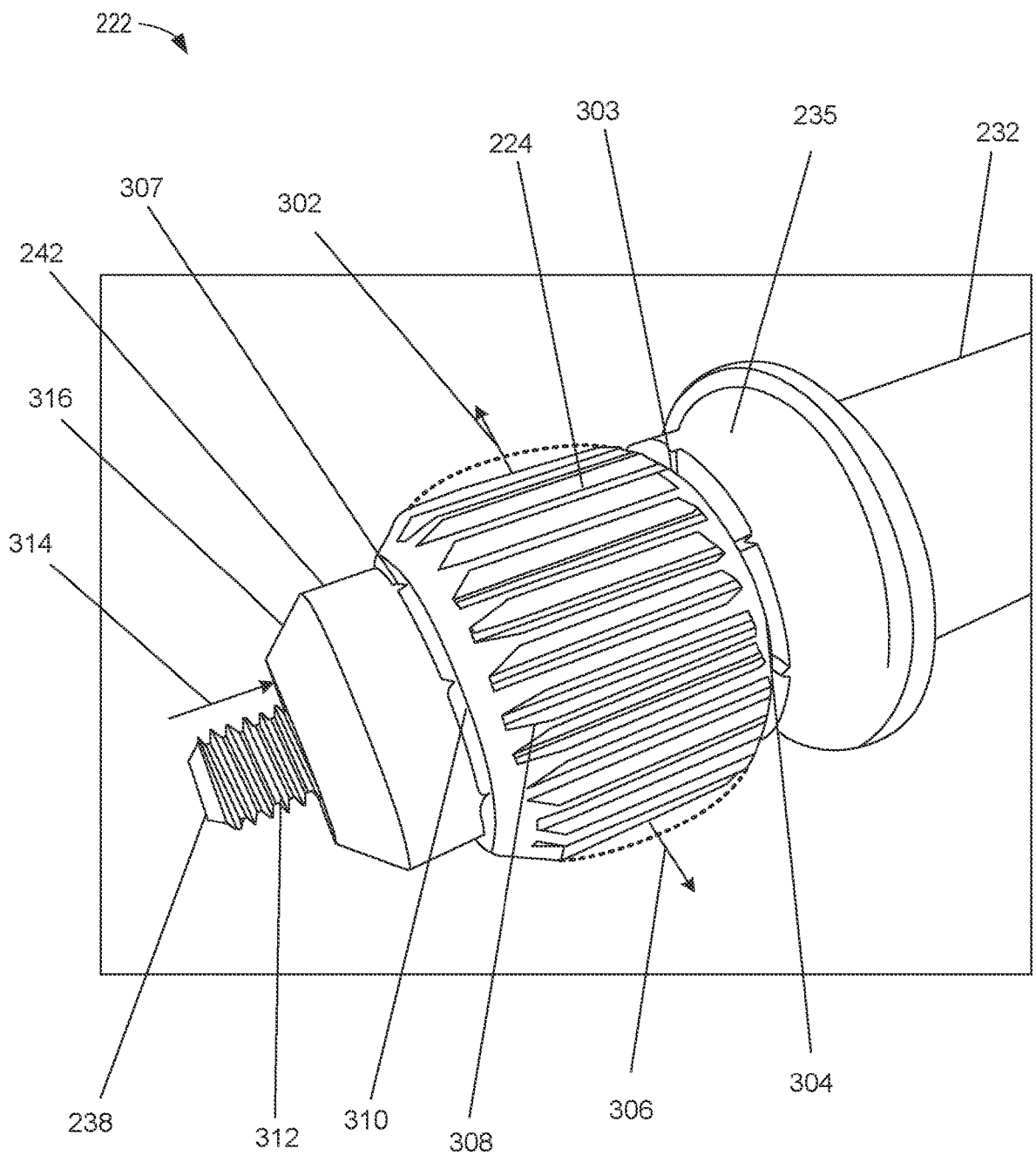
FIG. 3 is another illustration of the example motor alignment tool.

FIG. 3 is another illustration of the example motor alignment tool 222. Although the structure and function of the second plug 224 is described in association with FIG. 3, the gearbox alignment tool 202 of FIG. 2 and the first plug 204 of FIG. 2 share functionalities described in association with FIG. 3.

FIG. 3 includes the example motor alignment tool 222, first ridges 303, a first beveled edge 304, second ridges 307, first protrusions 308, a second beveled edge 310, first threads 312, and a third beveled edge 316.

As shown in FIG. 3, an example first arrow 302 and an example second arrow 306 indicate directions of expansion of the example second plug 224 in response to an axial compression. An axial compression load is illustrated by an example third arrow 314.

Rotation of the example second cap screw 238 (e.g., that moves the second threaded nut 242 in the direction of the third arrow 314) causes the plug to bulge outward (e.g., as illustrated by dotted line and in the direction of the first arrow 302 and the second arrow 306) and grip the internal motor splines 112 of FIG. 1. An amount of expansion of the example second plug 224 can be calculated based on the Poisson effect. The Poisson effect is associated with a materials tendency to expand in a direction perpendicular to an axis of compression. A Poisson ratio is a ratio of relative contraction to relative expansion. In some examples, a material for the first plug 204 and the second plug 224 is selected based on the materials modulus of elasticity and/or a desired Poisson ratio. Example materials with suitable Poisson's ratios include urethanes and polymers (fluoropolymer elastomers, ethylene propylene diene monomer, nitrile rubber, etc.). Using "soft" materials such as this also has the added benefit of reducing and/or preventing potential damage to the female shaft contours into which the tool is inserted.

Although examples disclosed herein are described in association with a motor-driven propeller, the apparatus and methods described herein may be extended for use in other scenarios than those described above (e.g., within the aerospace industry, within industrial robotics, etc.). Generally, one or more alignment tools as described herein may be used for alignment of a driver component (e.g., a prime mover) and a driven component. The driver component may be an electric motor, a fluidic motor (e.g., air, hydraulic, etc.), a diesel engine, a gasoline engine, a steam engine, a steam turbine, a gas turbine, a windmill, etc. The driven component may be a stationary component such as a pump, a compressor, a generator, a fan, a milling machine, a rolling mill, a lathe, etc. Alternatively or additionally, the driven component may be a mobile component such as an automobile (e.g., a car, a truck, etc.), an aviation propeller, a marine propeller, a locomotive, etc. The driver component and the driven component may be connected by a gearbox or a transmission, for example. The alignment tools described herein may be used for alignment of any combination of the driver component and the driven components listed above. For example, a diesel engine may be coupled to a generator, a steam engine may be coupled to a ship's propeller, a hydraulic fluidic motor may be coupled to a milling machine, etc. In each example, the driver component and the driven component can be aligned using the alignment tools described herein.

As another example, the elastomeric plug(s) described herein can be repurposed as robotic gripper(s) that grip an object in the center hole (e.g., based on the Poisson effect) when the elastomeric plug(s) is/are axially compressed.

Since the example second plug 224 is made of an elastomer, the second plug 224 does not damage the internal motor splines 112 upon expansion, as the second plug 224 makes a soft compressive contact with the internal motor splines 112 of FIG. 2. As the second cap screw 238 is tightened, the second cap screw 238 applies pressure to the second plug 224. As the second plug 224 is urethane or another elastomer, the second plug 224 does not cause a metal-to-metal load that could damage the motor armature shaft 106 of FIG. 1. Thus, the second plug 224 causes a firm contact between the soft, rubbery second plug 224 and the motor armature shaft 106.

FIG. 3 illustrates additional characteristics of the example motor alignment tool 222. The motor alignment tool 222 includes the first ridges 303 of the second neck 235. The first ridges 303 are sharp ridges and/or teeth that press into the second plug 224, securing the second plug 224 to the second neck 235.

The example second threaded nut 242 includes the second ridges 307. The second ridges 307 are sharp ridges and/or teeth that press into the second plug 224, securing the second plug 224 to the second nut 242 and reducing rotation.

When the example second cap screw 238 is tightened (e.g., by an Allen wrench), the first threads 312 rotate. The second shaft 232 and the second neck do not rotate, however. Furthermore, as the first ridges 303 protrude into the second plug 224, the second plug 224 does not rotate with the second cap screw 238. The second threaded nut 242 is coupled to the second plug 224 by the second ridges 307 and therefore does not rotate with the second cap screw 238.

Accordingly, as the example second cap screw 238 is rotated, the second nut 242 is displaced in the direction of the third arrow 314, causing the second plug 224 to expand and exhibit the Poisson effect.

The example second plug 224 includes the first beveled edge 304 and the second beveled edge 310. The first and second beveled edges 304 and 310 facilitate insertion of the motor alignment tool 222 into the motor 102 of FIG. 1. The second threaded nut 242 includes the third beveled edge 316 to facilitate insertion of the tool into the motor 102 of FIG. 1. (e.g., by self-centering). First protrusions 308 mate with the female splines in the motor 102 of FIG. 1, further securing the motor alignment tool 222 to the motor 102 of FIG. 1.

Figure 4:
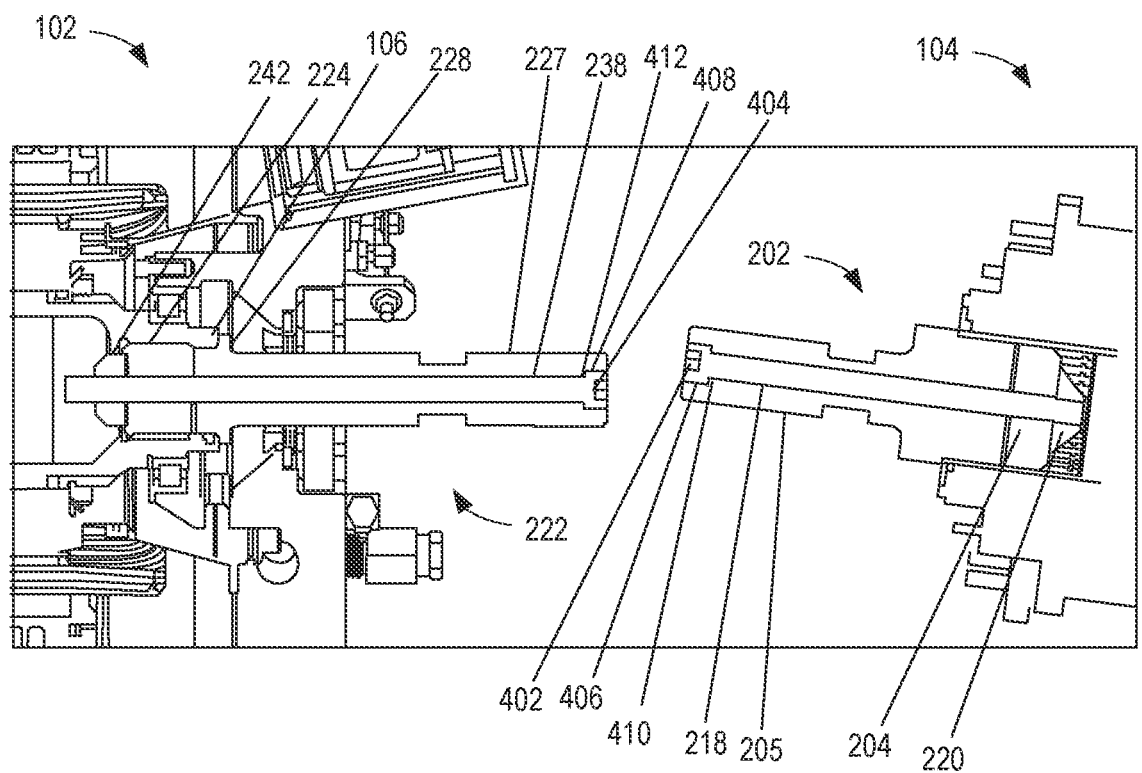
FIG. 4. is an illustration of an example gearbox alignment tool inserted in a gearbox and a motor alignment tool inserted in a motor.

FIG. 4. is a cross-sectional view of the example gearbox alignment tool 202 inserted into the gearbox 104 and the motor alignment tool 222 inserted into the motor 102.

The example gearbox alignment tool 202 further includes a first axial hole 410 and a first counterbore 406. The first axial hole 410 extends through the first tubular body 205. The first counterbore 406 is a cylindrical flat-bottomed hole extending partially within the first tubular body 205, that is coaxial with, and of greater diameter than, the first axial hole 410. The first cap screw 218 includes a first socket head 402 that is of greater diameter than the first axial hole 410 and of a lesser diameter than the first counterbore 406. The first counterbore 406 allows the first cap screw 218 to sit flush with an outer face of the gearbox alignment tool 202. The example first socket head 402 is rotated by a hex key and/or any other adjustment device to cause the first threaded nut 220 to compress the first plug 204 and cause the first plug 204 to expand, as previously described.

The example motor alignment tool 222 includes a second axial hole 412 and a second counterbore 408. The second axial hole 412 extends through the second tubular body 227. The second counterbore 408 is a cylindrical flat-bottomed hole extending partially within the second tubular body 227, that is coaxial with, and of greater diameter than, the second axial hole 412. The second counterbore 408 allows the second cap screw 238 to sit flush with an outer face of the motor alignment tool 222. An example second socket head 404 is rotated to compress the second plug 224 and cause the second plug 224 to expand.

The counterbore feature and use of a socket-head cap screw, such as first cap screw 218 and second cap screw 238, inside the shafts 212 and 232 of the first tubular body 205 and 227, respectively, may be optional in some examples. Other methods for compressing the plugs 204 and 224 can be used. For example, an air or hydraulically operated cylinder and rod can also be used to compress the plugs 204, 224.

Figure 5A:
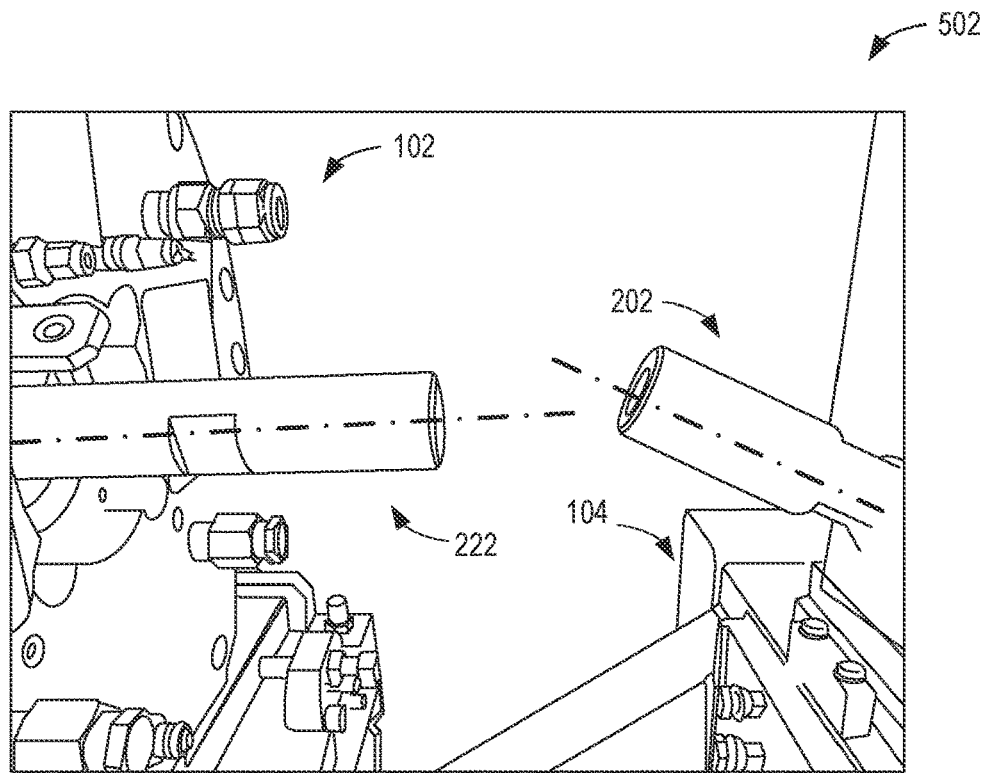
FIG. 5A illustrates an example misaligned motor and gearbox.

FIG. 5A is an example first illustration 502 that shows alignment of the example motor 102 with the gearbox 104. A first illustration 502 includes the gearbox alignment tool 202 and the motor alignment tool 222 that are out of alignment.

Figure 5B:
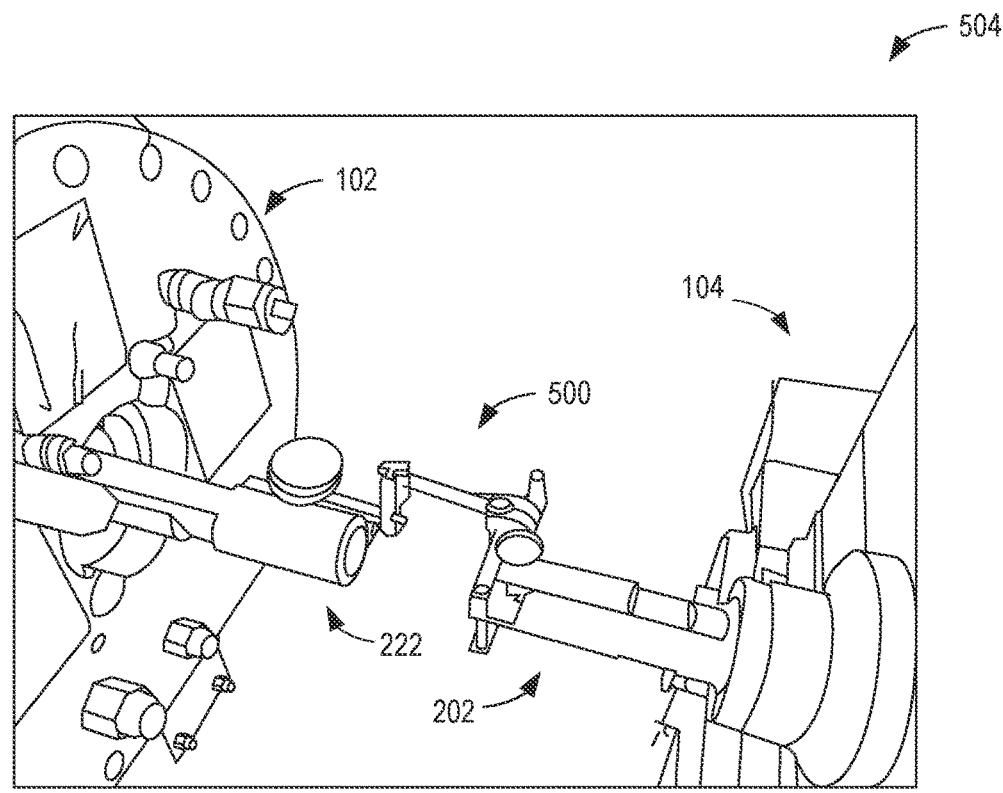
FIG. 5B illustrates the example misaligned motor and gearbox of FIG. 5A after alignment.

FIG. 5B is an example second illustration 504 that includes a dial indicator 500 that can be used to facilitate alignment of the motor 102 and the gearbox 104 based on the example motor alignment tool 222 and the example gearbox alignment tool 202.

The example dial indicator 500 determines whether the motor alignment tool 222 and the gearbox alignment tool 202 are properly aligned. Based on a reading of the dial indicator 500, the motor 102 and/or the gearbox 104 can be moved and rotated to facilitate parallel and angular alignment.

Figure 6A:
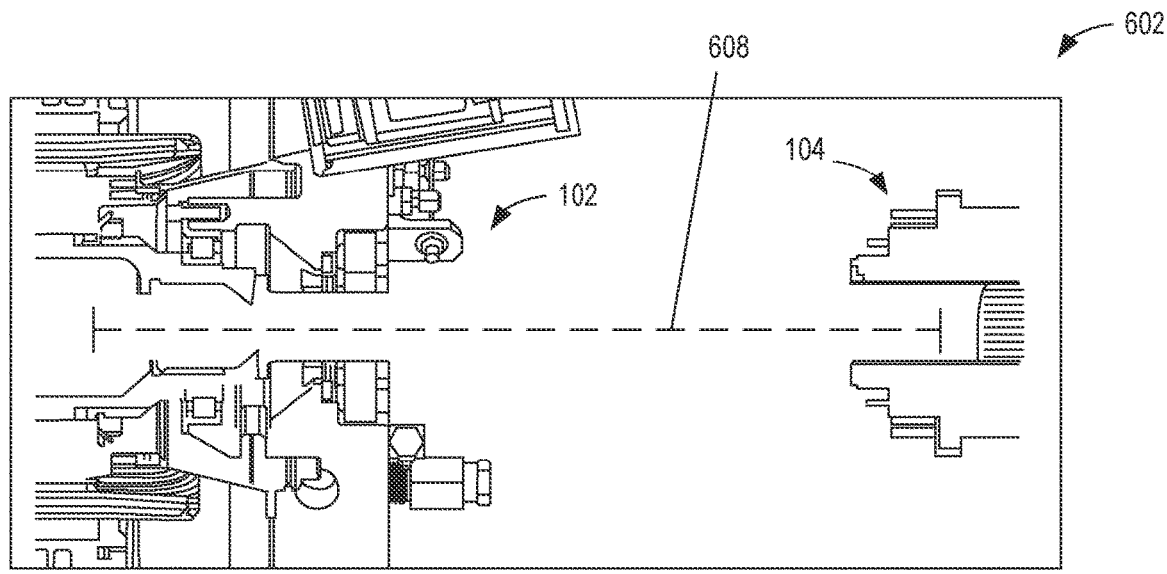
FIG. 6A illustrates an example aligned motor-driven propeller.

FIG. 6A is a third illustration 602 in which the motor 102 and the gearbox 104 are in parallel and angular alignment, as illustrated by a shaft alignment axis 608. In some examples, at least one of the example gearbox 104 or the motor 102 is pinned into position, allowing removal of the other of the motor 102 and/or the gearbox 104.

Figure 6B:
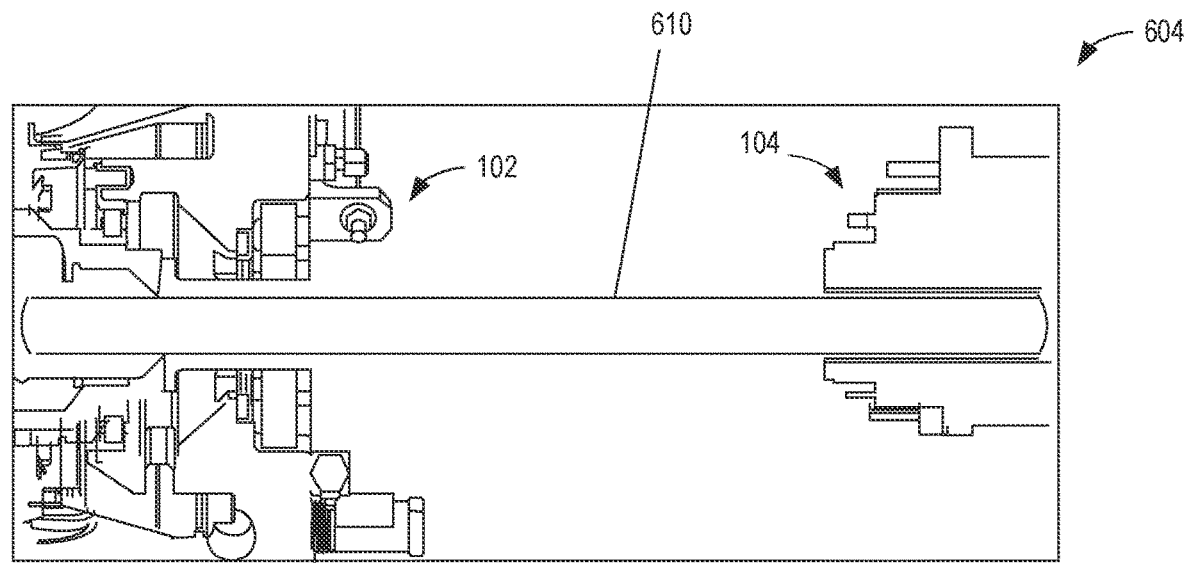
FIG. 6B illustrates an example shaft installed in the aligned motor-driven propeller of FIG. 6A.

FIG. 6B is a fourth illustration 604 that shows a shaft 610 installed and in proper alignment. After the motor 102 and/or the gearbox 104 are removed, the example shaft 610 is inserted. The motor 102 and/or the gearbox 104 is then re-positioned based on the prior pinning. The shaft 610 is installed in an aligned motor-driven propeller to connect the motor 102 and the gearbox 104.

Figure 7:
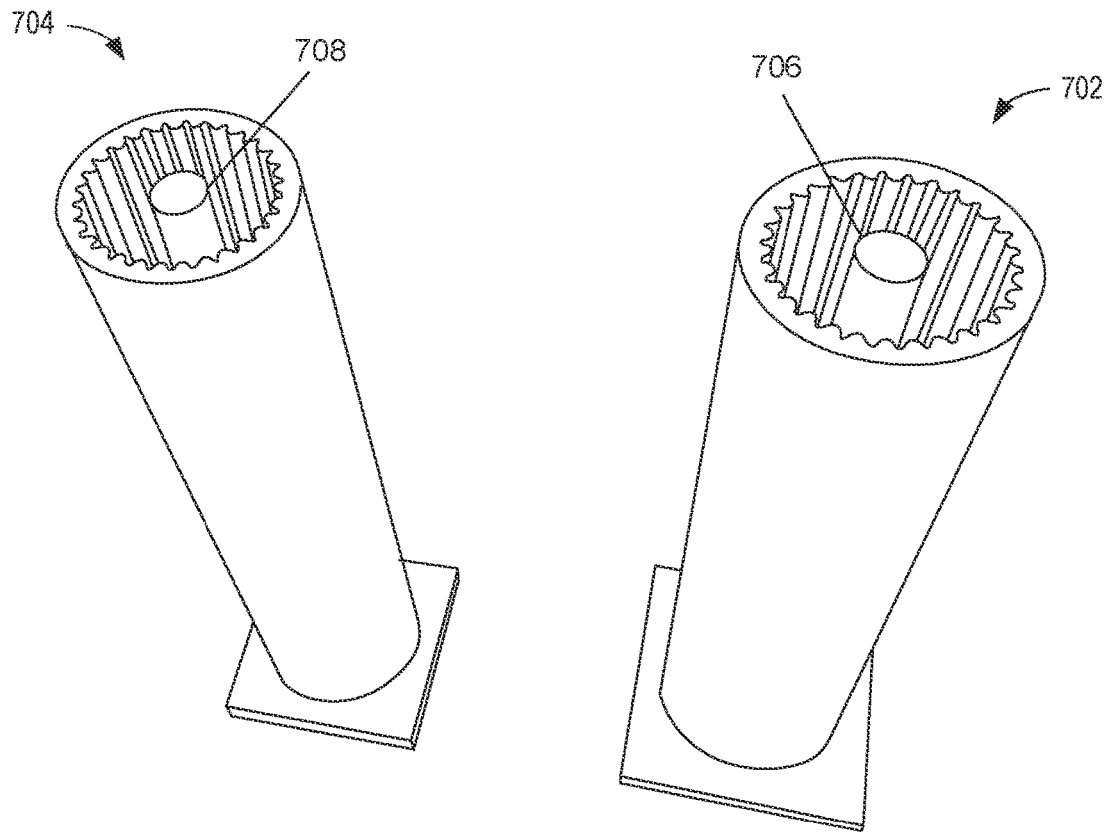
FIG. 7 illustrates example plug molds.
Figure 7:
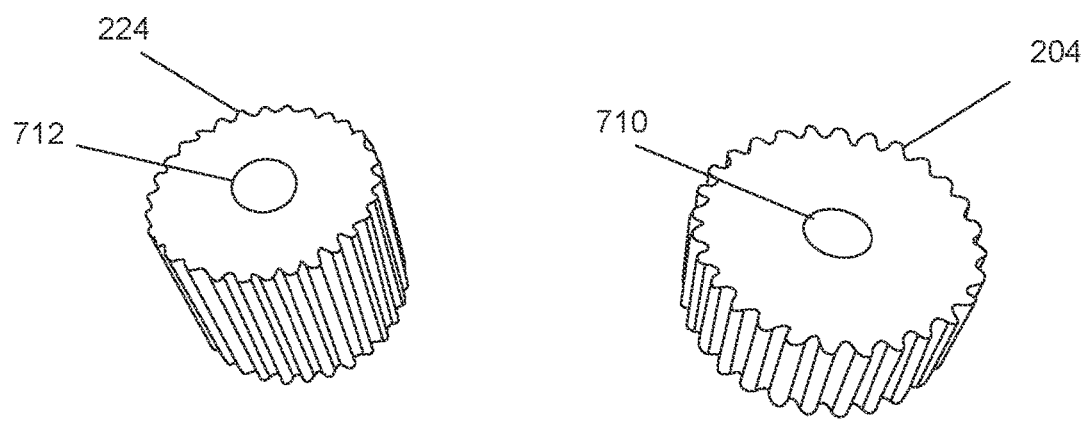

FIG. 7 illustrates example molds for casting the first plug 204 and second plug 224 as described herein. A first mold 702 is a mold that can cast the first plug 204. A second mold 704 is a second mold that can cast the second plug 224. The first mold 702 and the second mold 704 are three-dimensional molds that include contours of each respective plug. To accurately form the plugs 204, 224, the first mold 702 and the second mold 704 replicate the internal splines of the motor armature shaft 106 of FIG. 1 and the gearbox shaft 107 of FIG. 1, respectively. The first mold 702 includes a first cylindrical member 706 to form a first hole 710 in the first plug 204. The second mold 704 includes a second cylindrical member 708 to form a second hole 712 in the second plug 224. The first hole 710 and/or the second hole 712 may accommodate a compression-generating component such as a cap screw, bolt, or hydraulic/air cylinder shaft. More particularly, the hole 710 in first plug 204 accommodates the first cap screw 218 (FIG. 2) and the hole 712 in the second plug 224 accommodates the second cap screw 238 (FIG. 2).

Figure 8:
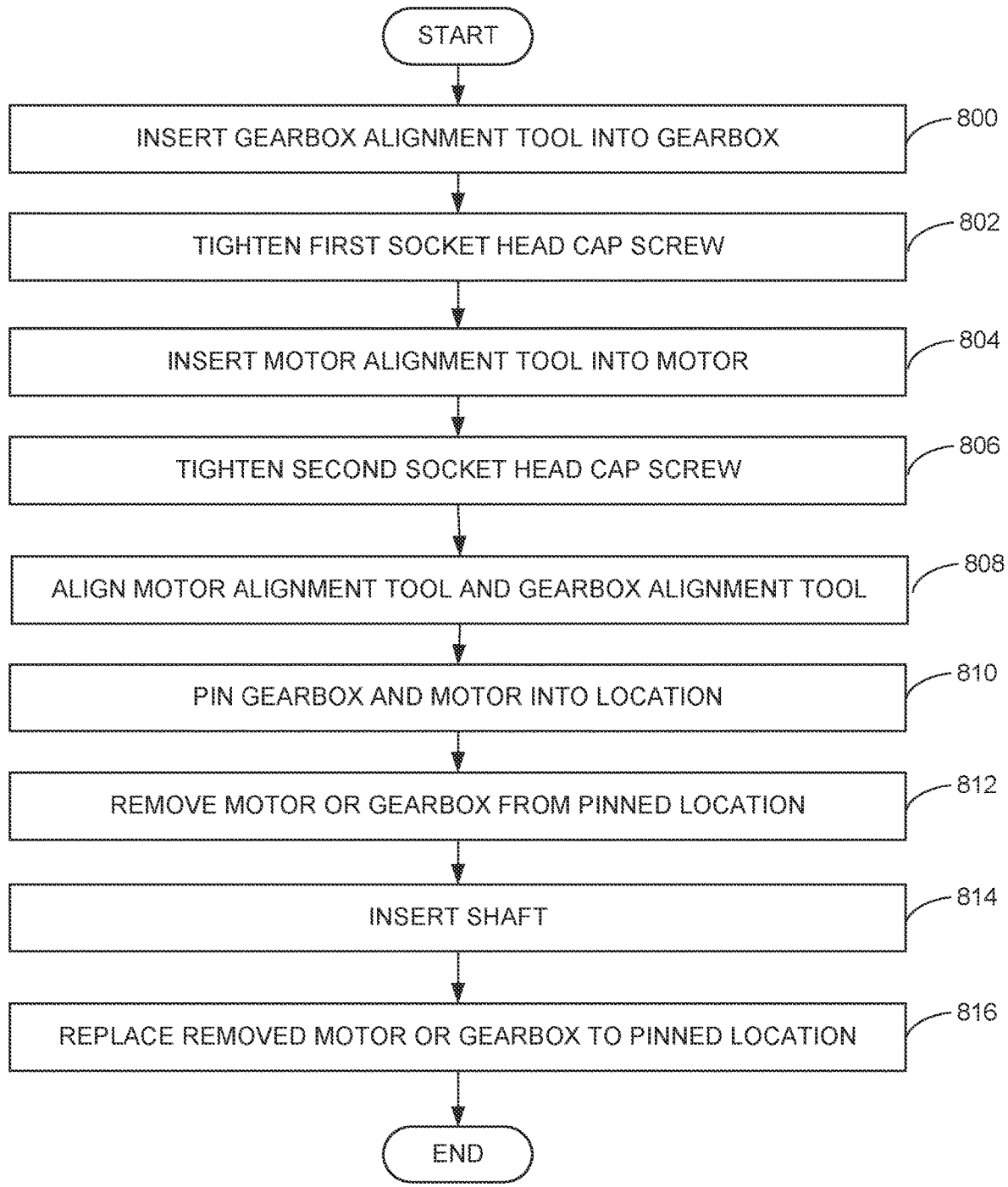
FIG. 8 is a flowchart illustrating an example method to align a motor-driven propeller.

FIG. 8 is a flowchart illustrating an example method to align a motor-driven propeller. The example method begins at block 800 at which the gearbox alignment tool 202 of FIG. 2 is inserted into the gearbox 104 of FIG. 1. At block 802, the first cap screw 218 of FIG. 2 is tightened. For instance, tightening of the first cap screw 218 causes the first plug 204 of FIG. 2 to expand and secure the gearbox alignment tool 202 of FIG. 2.

At block 804, the example motor alignment tool 222 of FIG. 2 is inserted into the motor 102 of FIG. 1. At block 806, the second cap screw 238 of FIG. 2 is tightened. For instance, tightening the second cap screw 238 of FIG. 2 causes the second plug 224 to expand and secure the motor alignment tool 222 of FIG. 2 to the motor 102 of FIG. 1.

At block 808, the example motor alignment tool 222 of FIG. 2 and the gearbox alignment tool 202 of FIG. 2 are aligned. For instance, the gearbox alignment tool 202 and the example motor alignment tool 222 of FIG. 2 can be aligned using dial indicator 500 of FIG. 5B.

At block 810, the example gearbox 104 of FIG. 1 and/or the motor 102 of FIG. 2 are pinned into location. For instance, the motor 102 of FIG. 2 can be pinned into location before removing the gearbox 104 of FIG. 1 at block 812.

At block 814, the example drive shaft 610 of FIG. 6B is placed in the motor 102 of FIG. 1 or the gearbox 104 of FIG. 1 before replacing the motor 102 of FIG. 1 or the example gearbox 104 of FIG. 1 at block 816.

From the foregoing, it will be appreciated that example systems, apparatus, and articles of manufacture have been disclosed that enable alignment of a motor-driven propeller. Examples disclosed herein include an example gearbox alignment tool and an example motor alignment tool. Disclosed examples facilitate effective alignment of internally splined shafts. Proper alignment of the shafts reduces stress on the rotating machinery, improving part lifespan and machinery safety.

Example methods, apparatus, systems, and articles of manufacture to align motor-driven propellers are disclosed herein. Further examples and combinations thereof are provided by the subject matter of the following clauses:

An apparatus comprising a tubular body including a shaft, a shoulder, and a neck, the shaft coupled to the shoulder, the shoulder coupled to the neck, the shoulder having a greater diameter than respective diameters of the shaft and the neck, a plug coupled to the shoulder at a first plug edge and coupled to a first fastener at a second plug edge, the first fastener including a hole, and a second fastener coupled to the first fastener, the second fastener extending through the tubular body, the plug, and the first fastener.

The apparatus of the preceding clause, wherein the first fastener is a threaded nut, the second fastener is a cap screw, and wherein the tubular body, the plug, the threaded nut, and the cap screw define a motor alignment tool, the motor alignment tool coupled to a motor, the shaft extending from the motor to facilitate alignment of the motor.

The apparatus of any preceding clause, wherein the tubular body is a first tubular body, the plug is a first plug, the threaded nut is a first threaded nut, the cap screw is a first cap screw, and further including a gearbox alignment tool to facilitate an alignment of a gearbox with the motor, the gearbox alignment tool including a second tubular body, a second plug, a second threaded nut, and a second cap screw.

The apparatus of any preceding clause, wherein tightening the second cap screw causes an axial displacement of the second threaded nut from a first position to a second position, wherein the second position is nearer the second tubular body than the first position, and wherein a diameter of the second plug increases to contact the gearbox in response to the axial displacement.

The apparatus of any preceding clause, wherein the tubular body includes first ridges protruding into the plug and toward the threaded nut, and wherein the threaded nut includes second ridges protruding into the plug and towards the tubular body, the threaded nut threadably coupled to the cap screw.

The apparatus of any preceding clause, wherein a first end of the tubular body includes a second hole with a counterbore, the second hole extending through the shaft, the shoulder, and the neck to a second end of the tubular body.

The apparatus of any preceding clause, wherein the second cap screw further includes threads at a first end of the second cap screw, and a socket head at a second end of the second cap screw.

The apparatus of any preceding clause, wherein the first plug edge and the second plug edge are beveled, and wherein the plug includes radially outward extending protrusions.

The apparatus of any preceding clause, wherein the first fastener includes threads to threadably couple the first fastener to the second fastener.

The apparatus of any preceding clause, the tubular body further including a first flat member and a second flat member to secure the shaft for tightening of the second fastener.

The apparatus of any preceding clause, wherein the tubular body is a unitary member.

An alignment apparatus for a motor-driven propeller comprising a motor tool coupled to a motor of the motor-driven propeller, the motor tool extending from the motor to facilitate an alignment of the motor-driven propeller, a gearbox tool coupled to a gearbox of the motor-driven propeller and extending from the gearbox to facilitate the alignment, and at least one of the gearbox tool or the motor tool including a tubular body including a shaft, a shoulder, and a neck, the shaft coupled to the shoulder, the shoulder coupled to the neck, a plug coupled to the shoulder at a first plug edge and coupled to a first fastener at a second plug edge, the first fastener including a hole, and a second fastener extending through the tubular body, the plug, and the first fastener.

The alignment apparatus of the preceding clause, wherein the first fastener is a threaded nut, the second fastener is a cap screw, wherein to tighten the cap screw causes a displacement of the threaded nut from a first position to a second position, wherein the second position is nearer the tubular body, and wherein the displacement of the threaded nut causes the plug to increase in diameter to contact at least one of the gearbox or the motor.

The alignment apparatus of any preceding clause, the tubular body including first ridges protruding into the plug and towards the first fastener, the first fastener including second ridges protruding into the plug and towards the tubular body.

The alignment apparatus of any preceding clause, wherein a first end of the tubular body includes a second hole that extend through the shaft, the shoulder, and the neck to a second end of the tubular body.

The alignment apparatus of any preceding clause, wherein the first fastener is a cap screw that further includes threads at a first end of the cap screw, and a socket head at a second end of the cap screw.

The alignment apparatus of any preceding clause, wherein the first plug edge and the second plug edge are beveled, and wherein the plug includes at least one protrusion that extends radially outward.

The alignment apparatus of any preceding clause, wherein the tubular body is a one-piece body.

A method comprising inserting a gearbox alignment tool into a gearbox, tightening a first fastener of the gearbox alignment tool, inserting a motor alignment tool into a motor, tightening a second fastener of the motor alignment tool, and aligning the motor and the gearbox based on the motor alignment tool and gearbox alignment tool.

The method of the preceding clause, further including pinning the gearbox and the motor into an aligned location, removing the motor or the gearbox from the aligned location, inserting a shaft, and replacing the motor or the gearbox to the aligned location.

An alignment apparatus comprising at least one of a first alignment tool or a second alignment tool, the first alignment tool coupled to a driver component, the first alignment tool extending from the driver to facilitate an alignment, the second alignment tool coupled to a driven component and extending from the driven component to facilitate the alignment, and at least one of the first alignment tool or the second alignment tool including a tubular body including a shaft, a shoulder, and a neck, the shaft coupled to the shoulder, the shoulder coupled to the neck, a plug coupled to the shoulder at a first plug edge and coupled to a first fastener at a second plug edge, the first fastener including a hole, and a second fastener extending through the tubular body, the plug, and the first fastener.

The alignment apparatus of the preceding clause, wherein the first fastener is a threaded nut, the second fastener is a cap screw, wherein to tighten the cap screw causes a displacement of the threaded nut from a first position to a second position, wherein the second position is nearer the tubular body, and wherein the displacement of the threaded nut causes the plug to increase in diameter to contact at least one of the driver component or the driven component.

The alignment apparatus of any preceding clause, wherein the driver component is a motor and the driven component is a pump, a compressor, a generator, a fan, a milling machine, a rolling mill, or a lathe.

The alignment apparatus of any preceding clause, wherein the driver component is a motor and the driven component is an automobile, a truck, a propeller, or a locomotive.

The alignment apparatus of any preceding clause, wherein the motor is an electric motor.

The alignment apparatus of any preceding clause, wherein the motor a fluidic motor.

The alignment apparatus of any preceding clause, wherein the driver component is an engine and the driven component is a pump, a compressor, a generator, a fan, a milling machine, a rolling mill, or a lathe.

The alignment apparatus of any preceding clause, wherein the driver component is an engine and the driven component is an automobile, a truck, a propeller, or a locomotive.

The alignment apparatus of any preceding clause, wherein the engine is a diesel engine.

The alignment apparatus of any preceding clause, wherein the engine is a gasoline engine.

The alignment apparatus of any preceding clause, wherein the engine is a steam engine.

The alignment apparatus of any preceding clause, wherein the driver component is a turbine and the driven component is a pump, a compressor, a generator, a fan, a milling machine, a rolling mill, or a lathe.

The alignment apparatus of any preceding clause, wherein the driver component is a turbine and the driven component is an automobile, a truck, a propeller, or a locomotive.

The alignment apparatus of any preceding clause, wherein the turbine is a steam turbine.

The alignment apparatus of any preceding clause, wherein the turbine is a gas turbine.

The alignment apparatus of any preceding clause, wherein the driver component is a windmill and the driven component is a pump, a compressor, a generator, a fan, a milling machine, a rolling mill, a lathe, an automobile, a truck, a propeller, or a locomotive.

The alignment apparatus of any preceding clause wherein the driver component and the driven component are coupled by a gearbox or a transmission.

The alignment apparatus of any preceding clause, the tubular body including first ridges protruding into the plug and towards the first fastener, the first fastener including second ridges protruding into the plug and towards the tubular body.

The alignment apparatus of any preceding clause, wherein a first end of the tubular body includes a second hole that extend through the shaft, the shoulder, and the neck to a second end of the tubular body.

The alignment apparatus of any preceding clause, wherein the first fastener is a cap screw that further includes threads at a first end of the cap screw, and a socket head at a second end of the cap screw.

The alignment apparatus of any preceding clause, wherein the first plug edge and the second plug edge are beveled, and wherein the plug includes at least one protrusion that extends radially outward.

The alignment apparatus of any preceding clause, wherein the tubular body is a one-piece body.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   a tubular body including a shaft, a shoulder, and a neck, the shaft coupled to the shoulder, the shoulder coupled to the neck, the shoulder having a greater diameter than respective diameters of the shaft and the neck;
   a plug coupled to the shoulder at a first plug edge and coupled to a first fastener at a second plug edge, the first fastener including a hole; and
   a second fastener coupled to the first fastener, the second fastener extending through the tubular body, the plug, and the first fastener.

2. The apparatus of claim 1, wherein the first fastener is a threaded nut, the second fastener is a cap screw, and wherein the tubular body, the plug, the threaded nut, and the cap screw define a motor alignment tool, the motor alignment tool coupled to a motor, the shaft extending from the motor to facilitate alignment of the motor.

3. The apparatus of claim 2, wherein the tubular body is a first tubular body, the plug is a first plug, the threaded nut is a first threaded nut, the cap screw is a first cap screw, and further including a gearbox alignment tool to facilitate an alignment of a gearbox with the motor, the gearbox alignment tool including a second tubular body, a second plug, a second threaded nut, and a second cap screw.

4. The apparatus of claim 3, wherein tightening the second cap screw causes an axial displacement of the second threaded nut from a first position to a second position, wherein the second position is nearer the second tubular body than the first position, and wherein a diameter of the second plug increases to contact the gearbox in response to the axial displacement.

5. The apparatus of claim 2, wherein the tubular body includes first ridges protruding into the plug and toward the threaded nut, and wherein the threaded nut includes second ridges protruding into the plug and towards the tubular body, the threaded nut threadably coupled to the cap screw.

6. The apparatus of claim 2, wherein a first end of the tubular body includes a second hole with a counterbore, the second hole extending through the shaft, the shoulder, and the neck to a second end of the tubular body.

7. The apparatus of claim 4, wherein the second cap screw further includes:
   threads at a first end of the second cap screw; and
   a socket head at a second end of the second cap screw.

8. The apparatus of claim 1, wherein the first plug edge and the second plug edge are beveled, and wherein the plug includes radially outward extending protrusions.

9. The apparatus of claim 1, wherein the first fastener includes threads to threadably couple the first fastener to the second fastener.

10. The apparatus of claim 1, the tubular body further including a first flat member and a second flat member to secure the shaft for tightening of the second fastener.

11. The apparatus of claim 1, wherein the tubular body is a unitary member.

12. An alignment apparatus for a motor-driven propeller comprising:
   a motor tool coupled to a motor of the motor-driven propeller, the motor tool extending from the motor to facilitate an alignment of the motor-driven propeller;
   a gearbox tool coupled to a gearbox of the motor-driven propeller and extending from the gearbox to facilitate the alignment; and at least one of the gearbox tool or the motor tool including:
- a tubular body including a shaft, a shoulder, and a neck, the shaft coupled to the shoulder, the shoulder coupled to the neck;
- a plug coupled to the shoulder at a first plug edge and coupled to a first fastener at a second plug edge, the first fastener including a hole; and
- a second fastener extending through the tubular body, the plug, and the first fastener.

13. The alignment apparatus of claim 12, wherein the first fastener is a threaded nut, the second fastener is a cap screw, wherein to tighten the cap screw causes a displacement of the threaded nut from a first position to a second position, wherein the second position is nearer the tubular body, and wherein the displacement of the threaded nut causes the plug to increase in diameter to contact at least one of the gearbox or the motor.

14. The alignment apparatus of claim 12, the tubular body including first ridges protruding into the plug and towards the first fastener, the first fastener including second ridges protruding into the plug and towards the tubular body.

15. The alignment apparatus of claim 13, wherein a first end of the tubular body includes a second hole that extend through the shaft, the shoulder, and the neck to a second end of the tubular body.

16. The alignment apparatus of claim 14, wherein the first fastener is a cap screw that further includes:
- threads at a first end of the cap screw; and
- a socket head at a second end of the cap screw.

17. The alignment apparatus of claim 16, wherein the first plug edge and the second plug edge are beveled, and wherein the plug includes at least one protrusion that extends radially outward.

18. The alignment apparatus of claim 12, wherein the tubular body is a one-piece body.

19. A method comprising:
- inserting a gearbox alignment tool into a gearbox;
- tightening a first fastener of the gearbox alignment tool;
- inserting a motor alignment tool into a motor;
- tightening a second fastener of the motor alignment tool; and
- aligning the motor and the gearbox based on the motor alignment tool and gearbox alignment tool.

20. The method of claim 19, further including:
- pinning the gearbox and the motor into an aligned location;
- removing the motor or the gearbox from the aligned location;
- inserting a shaft; and
- replacing the motor or the gearbox to the aligned location.

* * * * *